United States Patent
Natarajan et al.

(10) Patent No.: US 7,293,106 B2
(45) Date of Patent: Nov. 6, 2007

(54) METHOD OF FINDING A PATH BETWEEN TWO NODES IN A NETWORK

(75) Inventors: Srikanth Natarajan, Fort Collins, CO (US); Darren D. Smith, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 731 days.

(21) Appl. No.: 10/154,912

(22) Filed: May 28, 2002

(65) Prior Publication Data

US 2003/0225906 A1 Dec. 4, 2003

(51) Int. Cl.
G06F 15/173 (2006.01)
(52) U.S. Cl. .................... 709/238; 709/221; 709/239; 709/240; 709/242; 709/249; 370/254; 370/255
(58) Field of Classification Search ................. 709/242, 709/220, 249, 221, 238, 239, 222, 223, 229, 709/232; 370/254, 255
See application file for complete search history.

(56) References Cited

U.S. PATENT DOCUMENTS

| | | | |
|---|---|---|---|
| 5,835,720 A * | 11/1998 | Nelson et al. ............... 709/224 |
| 6,578,087 B1 * | 6/2003 | Garakani et al. ........... 709/242 |
| 6,697,338 B1 * | 2/2004 | Breitbart et al. ........... 370/254 |
| 2002/0143787 A1 * | 10/2002 | Knee et al. ................. 707/102 |
| 2003/0115345 A1 * | 6/2003 | Chien et al. ................ 709/229 |

OTHER PUBLICATIONS

Stevens W.R., "TCP/IP Illustrated, vol. 1," 1994, Addison Wesley, pp. 137-138.*
"TCP/IP Network Administration," 2002, O'Reilly, "2.4 The Routing Table," at http://www.hn.edu.cn/book/Network/NetworkingBookshelf_2ndEd/tcp/ch02_04.htm.*

* cited by examiner

*Primary Examiner*—Yves Dalencourt

(57) ABSTRACT

The present invention is directed to finding a path between two nodes, including the routing and non-routing nodes of the path. Exemplary embodiments of the present invention are directed to a computer implemented method of finding a path between two nodes in a network. Exemplary steps of the method include obtaining information from a routing table of a first node in the path to determine a second node in the path; determining whether any non-routing nodes are in the path between the first and second nodes; and producing a representation of nodes in the path.

21 Claims, 7 Drawing Sheets

```
ROUTING TABLE
FOR ROUTING NODE B

SUBNET NUMBER         SUBNET MASK           NEXT HOP 128.96.34.0           255.255.255.128       INTERFACE 322
128.96.34.128         255.255.255.128       INTERFACE 326
128.96.33.0           255.255.255.0         ROUTING NODE A

SUBNET MASK 404                             ROUTING NODE A
DEFAULT
```

METHOD OF FINDING A PATH BETWEEN TWO NODES IN A NETWORK

BACKGROUND OF THE INVENTION

1. Field of the Invention

The present invention relates generally to computer network management, and in particular, to methods of finding a path between two nodes in a computer network.

2. Background Information

Network management protocols are used to keep track of state data of the nodes in a computer network, such as the Simple Network Management Protocol (SNMP). The Management Information Base (MIB) of the SNMP protocol defines the pieces of information that can be retrieved from a node. SNMP uses queries to the nodes to obtain information from MIB tables at the nodes. A client program, such as the Network Node Manager™ (NNM) product available from Hewlett Packard of Palo Alto, Calif. with the OpenView™ portfolio, can be used to produce SNMP queries to the nodes and to display the retrieved information.

One method of finding a route between nodes uses a command, such as the commonly available traceroute command. The traceroute command can be implemented using Internet Control Message Protocol (ICMP) queries to the computer network nodes.

Another method to determine the nodes in a path uses stored network topology information to calculate the path, and to find both routing and non-routing nodes of the path. The calculations do not always account for the state of the nodes which may have changed since the network topology information was last updated. This is especially an issue for routing nodes, whose routing tables typically change quite often.

SUMMARY OF THE INVENTION

The present invention is directed to finding a path between two nodes, including the routing and non-routing nodes of the path. Exemplary embodiments of the present invention are directed to a computer implemented method of finding a path between two nodes in a network. Exemplary steps of the method include obtaining information from a routing table of a first node in the path to determine a second node in the path; determining whether any non-routing nodes are in the path between the first and second nodes; and producing a representation of nodes in the path.

DETAILED DESCRIPTION OF THE PREFERRED EMBODIMENTS

Figure 1:
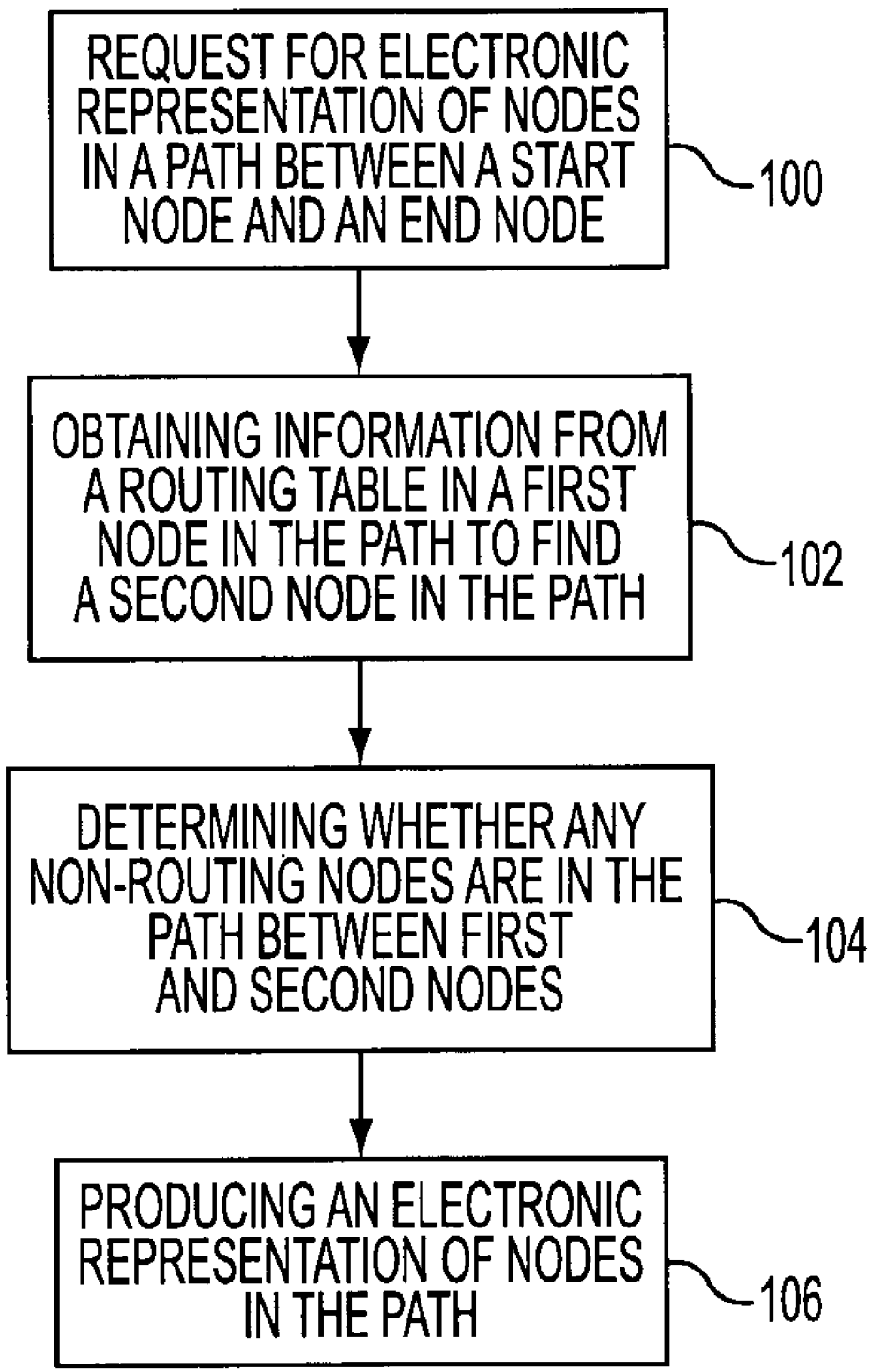
FIG. 1 is a flow chart that illustrates an exemplary method of the present invention.

FIG. 1 illustrates a flow chart of an exemplary computer implemented method of finding a path between two nodes in a network. The FIG. 1 method includes a step of obtaining information from a routing table of a first node in the path to determine a second node in the path. For example, in step 100, a request for a representation of nodes in a path between a start node and an end node is made. In an exemplary embodiment, the request can be a user request, a request initiated by software, or any other type of request for node information. The path can be considered to be an active path since information is obtained from at least some of the nodes in response to the request. In an exemplary embodiment, the nodes can be any type of network element including, but not limited to, network elements such as switches, hubs, bridges, routers, computers, and so forth.

In an exemplary embodiment, the routing table is an Internet Protocol routing table, an Internet Protocol forwarding table or any suitable stored compilation of routing information. The routing table can, for example, be a table maintained for a network management protocol in a first node of the path, such as the ipRouteTable MIB table, maintained for the Simple Network Management Protocol (SNMP) protocol, or any other desired routing table maintained for any desired protocol. For example, the routing table can be any suitable table stored at, or associated with, the first node which contains information concerning the next hop for the Internet Protocol, an internetworking protocol, and/or any packet forwarding protocol.

In an exemplary embodiment, nodes with routing tables can include routing nodes, such as routers, and/or computers or other devices that have a routing table but typically do not receive and forward packets. An example of a start node is a computer with a routing table that uses the routing table to initiate packet traffic, but does not typically receive and forward packets. In contrast, non-routing nodes can include nodes which may or may not have a routing table, but which do not use the routing table to transfer information through a given path. Examples can include, without limitation, switches, bridges and/or hubs. For example, non-routing nodes can switch based on Medium Access Control (MAC) layer addresses.

In step 102 of the FIG. 1 exemplary embodiment, information obtained from a routing table in a first node in the path is used to determine a second node in the path. For example, the information obtained from the routing table or the first node can be next hop information. In an alternate embodiment, any other suitable routing information can be obtained from the routing table as a routing indicator.

The FIG. 1 example also includes a step 104 of determining whether any non-routing nodes are in the path between the first and second nodes in the path. In this embodiment, the non-routing nodes do not have routing tables and are not found in step 102. The determining step can use, for example, stored network topology information to determine any non-routing nodes in the path between the first and second nodes. In alternate embodiments, any suitable stored information can be used which is sufficient to directly or indirectly determine any non-routing nodes in the path between the first and second nodes. The stored information can be located at the non-routing nodes, at a central location and/or any desired, suitable location.

In step 106 of the exemplary FIG. 1 embodiment, a representation of nodes in the path is produced. In an exemplary embodiment, this representation can indicate the nodes in the path, including routing and/or non-routing nodes. The representation can be, for example, at least one of an electronic display, a table, an electronic file, a printed representation, or any desired representation, electronic or otherwise, suitable for directly or indirectly describing and/or illustrating a relationship of nodes in a path.

Figure 2:
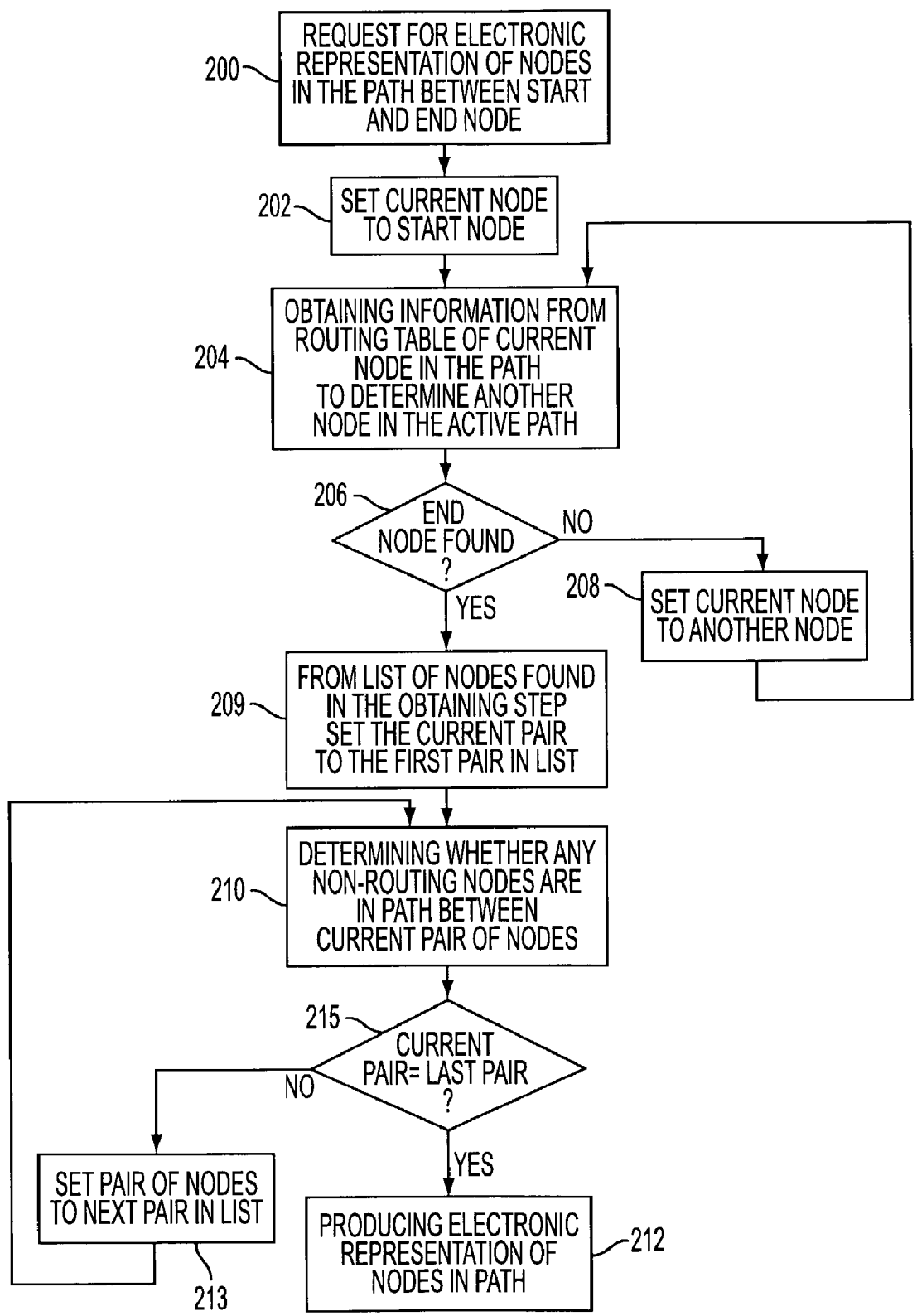
FIG. 2 is a flow chart that illustrates a more detailed illustration of an exemplary implementation of the FIG. 1 method.

FIG. 2 shows a more detailed illustration of an exemplary implementation of the FIG. 1 method, wherein a first node is considered a start node. In FIG. 2, a request is made in step 200 for an electronic representation of nodes in an active path between the start and an end node. In step 202, a first, or current, node under consideration is set to be the start node. In step 204, information obtained from the routing table of the current node in the path is used to determine "another node" in the path. For the first iteration of step 204, information from the routing table of the current node in the path is used to find the "another node" in the path.

Step 206 checks whether the "another node" found in step 204 is the end node of a desired path for which the end node is known (for example, a path for which the start and end nodes were selected by the user), or for which the end node can be determined from stored information associated with the end known (for example, an absence of routing information to another node). If the "another node" in step 204 is not the end node, in step 208, the "another node" found in step 204 is designated the current node, and the process of finding additional nodes between the start node and an end node continues. Thus, in an exemplary method, at least one other node in the path can be found by obtaining information from a routing table of at least one node found in a prior obtaining step.

In FIG. 2, assuming an end node has not yet been found, step 204 is repeated such that information obtained from a routing table of the current node, the node found in the last iteration of step 204, is used to find a subsequent "another node" in the path. Additional nodes are found using information obtaining steps until the end node is found. For example, the information obtaining step 204 is repeated until the end node is found.

After the end node is found, a determining step 210 is performed to determine whether any non-routing nodes are in the path between a first (e.g., start) node and a second (e.g., end) node. Alternatively, those skilled in the art will appreciate that a determining step can be performed with respect to two routing nodes, of the path while ongoing information obtaining steps are used to identify the end node of a given path.

In an exemplary method, the routing nodes found in the information obtaining step are paired, and a first determining step determines whether any non-routing nodes are in the path between a first pair of the nodes. At least one additional determining step can be used to determine whether any non-routing nodes are in the path between another pair of the nodes.

In step 209 of the exemplary FIG. 2 method, the first pair of nodes found in the obtaining step 204 is selected as a current pair of nodes. Step 210 determines whether any non-routing nodes are in a path between the current pair of nodes selected in step 209. Those skilled in the art will appreciate that the exact order of steps is not critical and that the method of FIG. 2 is by way of example only. For example, in an alternate embodiment, non-routing nodes can be found in the obtaining step 204 as the routing notes are located.

In the FIG. 2 method, any non-routing nodes in the path between each pair of routing nodes are determined. That is, the determining step 210 can be repeated for each pair of nodes found in the obtaining step 204, using for example, a "current node" and an "another node" found in one iteration of step 204.

In step 215, a determination is made as to whether the current pair of nodes is the last pair of nodes in the list (for example, the last pair of routing nodes in a path from a start node to an end node). If the current pair is the last pair of nodes, in step 212, a representation, such as an electronic representation, of nodes in the path is produced. Otherwise, in step 213, the "current pair" of nodes is set to the next pair of nodes in the list and step 210 is repeated. An electronic representation can be produced at any desired time in the FIG. 2 method to, for example, provide a partial or complete representation.

Figure 3:
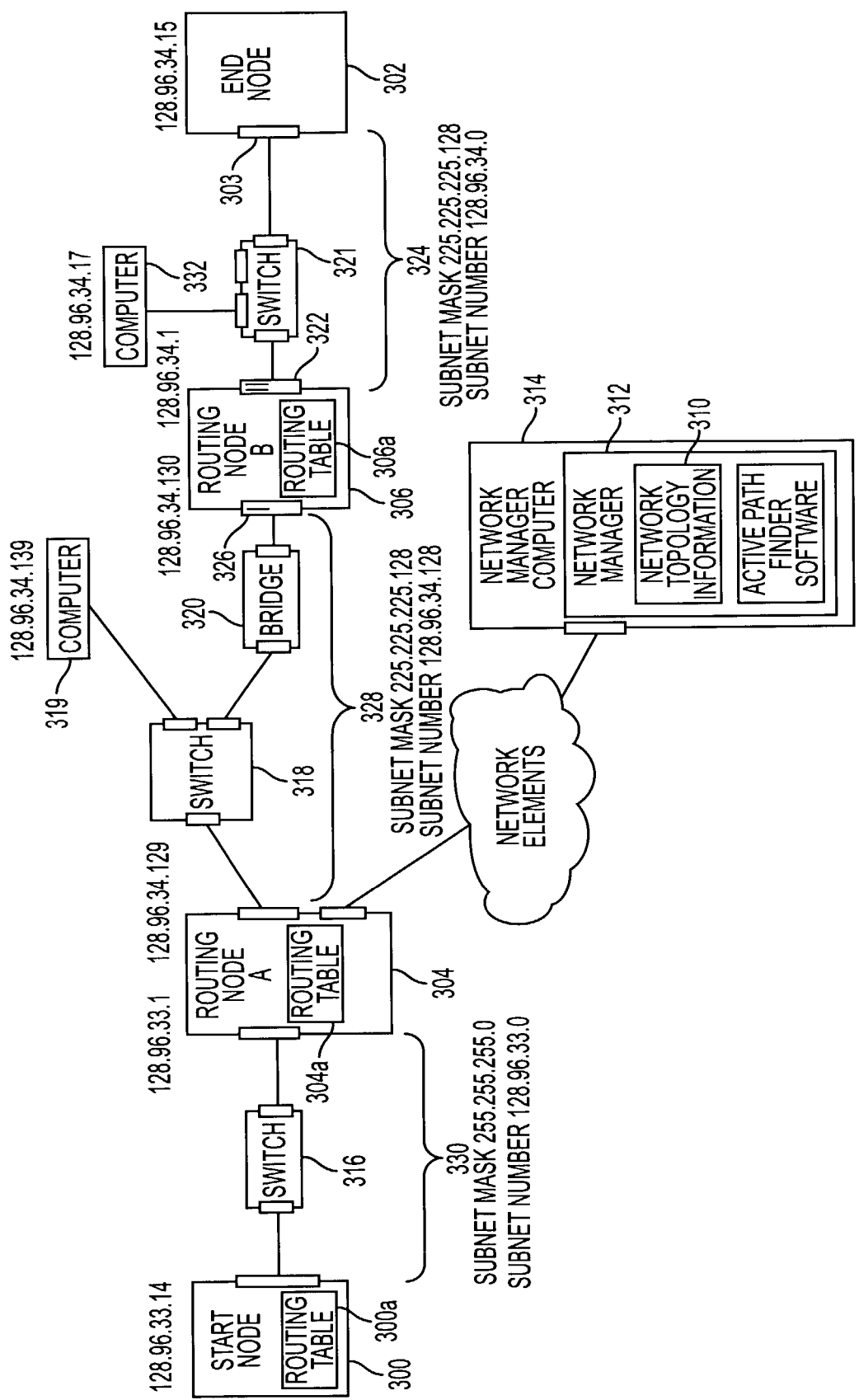
FIG. 3 is a diagram of an exemplary computer network implementing a method of the present invention.

FIG. 3 is a diagram of an exemplary computer network for implementing a method of the present invention. In the exemplary embodiment of FIG. 3, a path between start node 300 and end node 302 is to be determined. The start node 300 of this example includes a routing table 300a. The exemplary start node 300 is not a routing node, but is a computer with a routing table used to initiate packet traffic. For example, the routing table 300a identifies the routing node 304 as the default node for all packet traffic.

In operation, information from the routing table 300a is accessed during an information obtaining step to indicate that the next hop for traffic going to the end node 302 via the start node 300 is the routing node 304. During a subsequent information obtaining step, the routing table 304a of the routing node 304 is checked. Information from the routing table 304a can be used to indicate the next hop as routing node 306. The routing table 306a of routing node 306 is then checked. Information from the routing table 306a can be used to determine that the next hop is the end node 302.

Using the information obtaining steps, start node 300, routing node 304, routing node 306 and the node 302 are found. In this embodiment, non-routing nodes are not found in the information obtaining steps, although this feature could be included.

In an exemplary embodiment, network topology information 310 is stored in a network manager 312 of a network manager computer 314, and can be used during a non-routing node determining step to determine the non-routing nodes. Network topology information can be constructed, for example, in a manner as is done in products, such as Network Node Manager™ version NNM 6.2, described in an Administrator Manual and Installation Guide associated with "HP OpenView™ Solution, Network Node Manager," entitled "Managing your Network with NMM", published in March, 2001 by Hewlett Packard, HP Product No. J1240-90058 and in a document associated with "HP OpenView™ Solutions, Network Node Manager," entitled "A Guide To Scaleability and Distribution", published in March, 2001 by Hewlett Packard, HP Product No. J1240-90060, the disclosures of which are hereby incorporated by reference in their entireties.

In an exemplary embodiment, the non-routing nodes associated with any of plural path's between two routing nodes can, for example, be determined by using a shortest path algorithm, or any other desired algorithm, such as that described in copending U.S. application Ser. No. 09/964,843, entitled "System and Method For Determining Probable Network Paths Between Nodes In A Network Topology", filed Oct. 23, 2000, the disclosure of which is hereby incorporated by reference in its entirety. In the exemplary embodiment of FIG. 3, the network topology information 310 is examined to determine that switch 316 is in a path between the start node and routing node 304, to determine that switch 318 and bridge 320 are in a path between the routing node 304 and routing node 306, and to determine that the switch 321 is located in the path between the routing node 306 and the end node 302. In the exemplary embodiment of FIG. 3, each determination of any non-routing nodes between a pair of nodes can be done on a single subnet. A routing node can be directly connected to another routing node such that no non-routing nodes are in the path between the pair of routing nodes.

Because the non-routing nodes are determined in the FIG. 3 example based upon stored network topology information, the non-routing node information may be less current than the information determined by checking the routing tables. Where, for example, non-routing nodes do not switch configurations as often as the nodes with routing tables, reliance on this network topology information for the non-routing nodes is acceptable.

In the FIG. 3 example, the Internet Protocol (IP) technique of subnetting is used to locate nodes having routing tables. Subnetting is a technique that has been used to partition an address space for transferring data packets through a network. The subnetting technique can impact the scaleability of the Internet Protocol in certain embodiments, and can impact address assignment efficiency. For example, subnetting can avoid having to use a Class C or Class B address for each physical network. Additionally, subnetting can help aggregate information, since the routing nodes can store indications of a subnet, rather than indications of actual devices.

To better illustrate subnetting, consider that in FIG. 3, each of the routing nodes 304 and 306 has one or more interfaces. For example, routing node 306 has a number of different interfaces represented as an interface 322 on a subnet 324 and an interface 326 on a subnet 328. Subnet 324 is located between routing nodes 306 and 302, and includes switch 321 having multiple interfaces, and a computer 332. Subnet 328 is located between routing nodes 304 and 306, and includes switch 318, bridge 320 and a computer 319 connected to switch 318. A brief description of how subnetting has been used to handle traffic through a network will be provided, followed by a discussion of how subnetting can be used in accordance with exemplary embodiments of the present invention to identify routing nodes of a network.

Figures 4, 5:
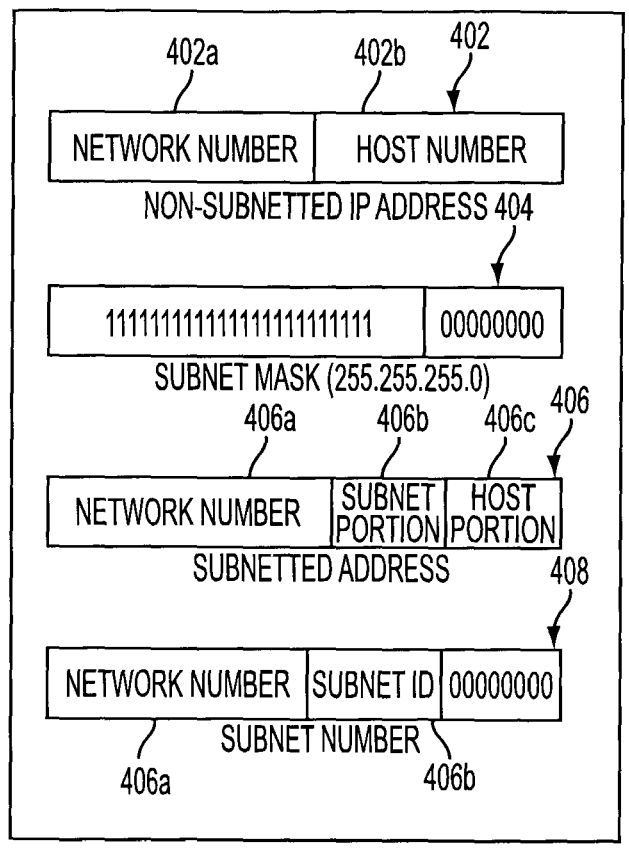
FIG. 4 is a diagram that illustrates an example of subnet addressing.
FIG. 5 is a diagram of an exemplary routing table for one routing node of FIG. 3.

FIG. 4 illustrates information associated with the FIG. 3 network, and will be initially used to describe an example of how subnet addressing can be used to transmit an IP packet over the FIG. 3 network. In FIG. 4, a non-subnetted IP address 402, such as a destination IP address, is divided into a network number 402*a* and a host number 402*b*. A subnet mask 404 is used to produce a subnetted address 406 which indicates the network number 406*a* (corresponding to network number 402*a* of the non-subnetted IP address), and which indicates a subnet portion 406*b* of the host number 402*b*, and a host portion 406*c* of the host number 402*b*. The subnetted address constitutes an address for the subnet of node elements located between routing nodes in the FIG. 3 example, although a subnet can include routing nodes or any desired network elements which can be identified as part of the subnet.

When a destination node for a given packet is not on a subnet directly connected to a routing node, the routing node routes the packet based on a subnet number 408 which, in an exemplary embodiment, includes the network number 406*a* and the subnet portion 406*b*, but does not use the host portion 406*c*. In this example, when the destination node is on a subnet directly connected to the routing node, the host portion 406*c* can be included to determine the next hop as the destination node. Regardless of whether the network number is a fixed number of bits (which may or may not be the case), the number of bits in the subnet and host portions can be varied as desired. For example, the number of bits used to represent the subnet portion can be a function of the desired number of subnets into which the network is divided, and the number of bits in the host portion can be a function of the number of separately addressable destination nodes within a given subnet.

FIG. 5 illustrates an exemplary routing table for the routing node 306 of FIG. 3, based on use of the Internet Protocol with subnetting, to transfer a data packet over the FIG. 3 network. Each entry of the exemplary routing table includes a subnet number, a subnet mask, and next hop information designated NextHop. For each IP packet received by the routing node 306, a destination IP address associated with the packet is configured using the format of non-subnetted IP address 402. The destination IP address is masked by a subnet mask associated with a given entry in the routing table and the resultant subnetted address (for example, having a format similar to that of subnetted address 406) is compared to the subnet number stored in the routing table which is associated with the mask used. This process can be repeated for each entry in the routing table until a match of the subnetted address to a subnet number is found.

For example, in FIG. 3, computer 332 has an IP address of 128.96.34.17. If routing node 306 receives an IP packet which includes the destination address for computer 332, the destination IP address associated with computer 332 (128.96.34.17) is bitwise ANDed to the subnet mask 404 of each routing table entry (for example, beginning with the first entry) to produce a subnetted address for each entry. Each subnetted address is compared with the subnet number associated with the mask used to determine whether the destination address of the computer 332 is included within the subnet connected to routing node 306. For the first entry of the routing table of FIG. 5, the bitwise AND of the subnet mask (225.225.225.128) and the destination IP address (128.96.34.17) is a subnet address 128.96.34.0 that matches the subnet number associated with the mask. The data to be sent to computer 332 is then sent through the indicated next hop (that is, NextHop) information stored in the routing table for the first entry, in this case, the interface 322. In an exemplary embodiment, the routing node 306 stores a table of Medium Access Control (MAC) addresses for each of the nodes on a subnet directly connected to the routing node and the IP packet is sent to the computer 332, although any desired information can, of course, be stored in the routing table.

In an exemplary embodiment, the next hop information indicates a routing node which is the next node, and/or it contains an interface identifier that allows for finding of the next node and/or any other desired information. The table entry for routing node 306 (also labeled routing node "B") can indicate a routing node, such as routing node 304 (also labeled routing node "A"), or indicate an interface onto which interface information can be sent. The routing table can also include a default indication labeled "Default" to indicate a location to which an IP packet is to be routed if no match is found in the routing table.

FIG. 5 illustrates an exemplary method of the present invention wherein the subnetting of FIGS. 3 and 4 is used to find those non-routing nodes in a path between a start node and an end node which include a routing table (that is, an exemplary technique to implement the FIG. 1 step 102). In an exemplary embodiment, beginning with the start node, the information obtaining step can comprise bitwise ANDing a subnet mask, such as the subnet mask 404, to an end node address to get a destination address and checking the routing table of the start node for the destination address.

Figure 6:
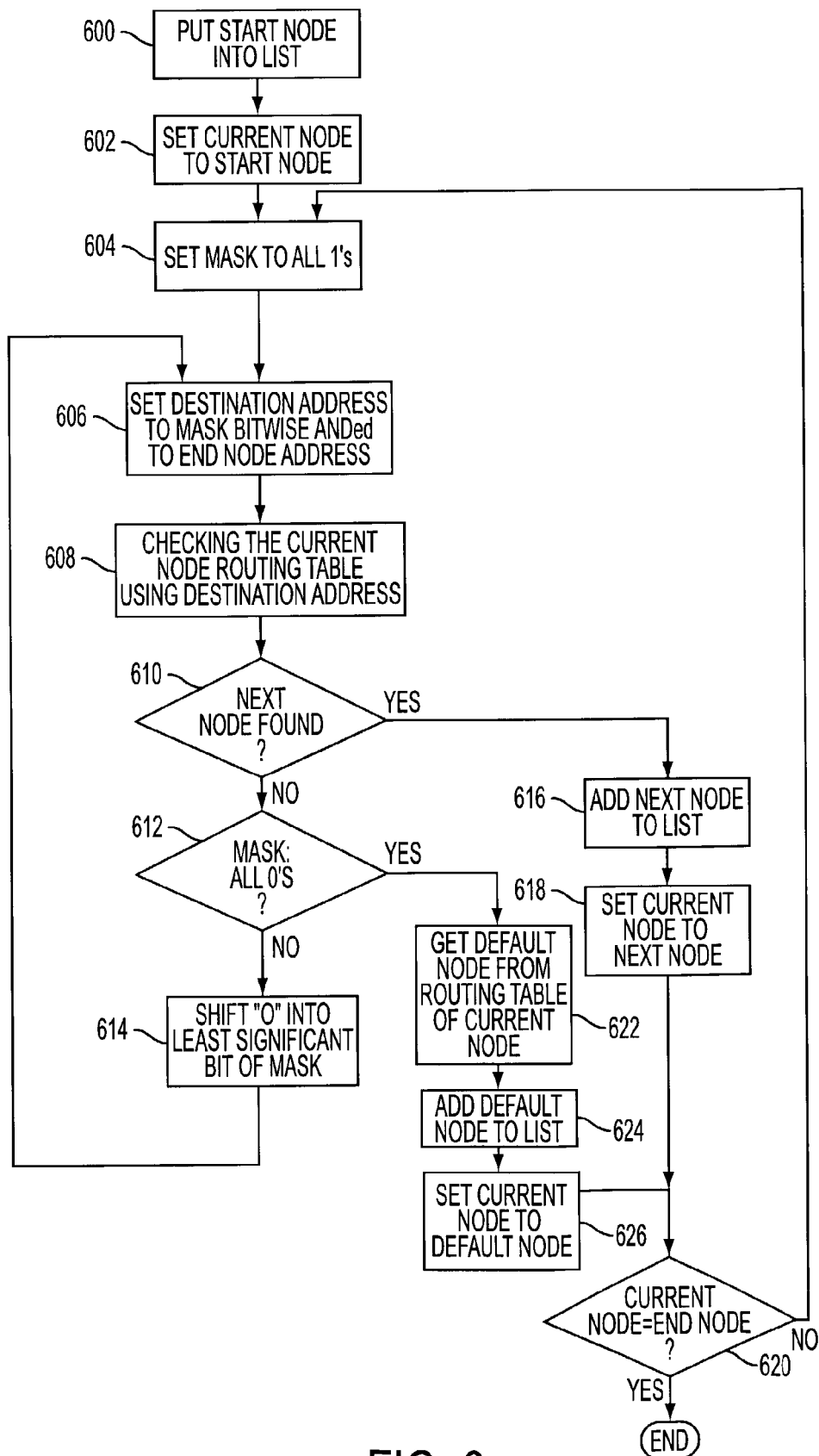
FIG. 6 is a flow chart that illustrates an exemplary method to find nodes in the path having routing tables.

Referring to step 600 of the FIG. 6 flow chart, a start node is input to a list. In step 602, the "current node" is set to the start node. In step 604, a mask is set to all 1's (255.255.255.255). The subnet mask 404 can be initially set to all 1's by any or all of the routing nodes and/or the network managing computer, and/or any computer used to perform the FIG. 6 method. The mask in the FIG. 6 example is used to account for subnetting in the Internet Protocol. In step 606, a destination address is set to a value produced by the mask bitwise ANDed to the end node address. For a first iteration of step 606, since the mask is all 1's, the destination address is the end node address. In step 608, the routing table of the current node is checked, using the destination address. For example, for the first iteration of step 608, the current node is the start node, so the start node's routing table checked using the destination address. Thus, an exemplary implementation begins by guessing that the start node and end node are sequential routing nodes in the path. However, those skilled in the art will appreciate that any desired masking, based on any desired assumptions, can be used. For example, the iterative process can begin with a mask that is all 0's, and then be incremented upward either numerically (that is, incrementing the mask by one with each iteration), or by changing the bits of the mask from a 0 to a one in any desired order.

In an exemplary embodiment, the mask begins as all 1's. With each iteration, the mask is shifted to the left to add a 0 in the least significant bit location, and the bitwise ANDing of the mask to the end node address is again performed. This process to obtain a destination address is repeated, along with the checking step, until the next node (that is, the node next to the current node having a routing table) is found or the mask is all 0's. In the exemplary embodiment of FIG. 6, if the next node is not found in step 610, in step 612 a determination in made as to whether the mask is all 0's (0.0.0.0) If not, in step 614, a "0" is shifted into the least significant bit (LSB) of the mask.

In the exemplary embodiment of FIG. 6, if the next node is found, then the next node is added to the list in step 616. In step 618, the current node is set to the next node value and in step 620, a determination is made as to whether the current node is the end node. If the current node is not the end node, then steps 604, 608, 610, 612, and 614 are repeated until the next node is found or, for the example described herein, the mask is all 0's.

If the mask becomes all 0's for the example described herein, without the next node being found, then a default node from the routing table can be obtained in step 622. In step 624, the default node is added to the list. In step 622, the current node is set to the default node and the process repeated until all nodes, from the start node to the end node, having routing tables are identified and added to the list.

An exemplary operation of the FIG. 6 method will be described with respect to the routing table for node 306, shown in FIG. 5, and the computer network shown in FIG. 3. To determine the next node having a routing table beginning from node 306, operation begins with the IP address of the end node. The end node IP address for end node 302 in the exemplary embodiment of FIG. 3 is 128.96.34.15. In the first iteration, the mask, such as mask 404, is 255.255.255.255 and the resulting destination address is produced by bitwise ANDing the mask to the end node address 128.96.34.15. This address does not match a subnet number in the routing table of the node 306. In the next iteration, the mask is altered by changing the least significant bit (LSB) to a 0 (that is, 255.255.255.254) and the resulting destination address 128.96.34.14 does not match a subnet number in the routing table. In the next iteration, the mask is again altered by changing the next LSB to form the mask 255.255.255.252, and the resulting destination address of 128.96.34.12 does not match a subnet number in the routing table. In the next iteration, the subnet mask is 255.255.255.248 and the destination address is 128.96.34.8 that does not match a subnet number in the routing table. In the next iteration, the subnet mask is 255.255.255.240 and the resulting destination address 128.96.34.0 matches the subnet number of the first entry of the routing table. The indicated next hop is interface 322 which means that the next node (that is, end node 302) is connected with subnet 324.

This example shows that the mask used to produce a matching destination address does not necessarily match the subnet mask of that entry. In the example given above, the mask used in the algorithm is 255.255.255.240 to identify routing node 302 as the next routing nodes in sequence. However, in the FIG. 5 routing table for node 306, interface 322 is associated with the subnet mask 255.255.255.128. This discrepancy can occur, for example, because the subnet masks are, in this example, associated with network elements contained within subnet 324, while the mask used to identify the next routing node associated with the node 306 is not included in the subnet, but interfaces to the subnet. In an exemplary embodiment, this subnet mask from the routing table need not be obtained to implement the FIG. 6 method.

Exemplary pseudocode to determine nodes with routing tables in the path is given below:

```
CalculateActiveLayer3Path
{
    Get the start node and the end node.
    Get their IP addresses using Domain Name Server (DNS) resolution
    Set start node IP address as the current address
    While (Not found the end node)
    {
        Get the ipAddrTable MIB table of the current address using the
SNMP Protocol
        Get the ifTable MIB table of the current address using the
SNMP protocol
        If getNextHop determines that we have reached the target break
        Get the IP address in the current node which belongs to the same
subnet as the next hop (start address)
        Append the start address and the next hop as a single structure
(known as the link) to the layer 3 path
        Set the next hop as the current address
        Continue
    }
}
getNextHop
{
    Get the current Hop IP address
    Get the end node IP address
    If the end node belongs to the current hop return end node
    Set mask to 255.255.255.255
    While mask is not 0.0.0.0 do
    {
        set destination = Logical bitwise AND of the end node address
            and the mask
        Get the next hop for the destination from the routing table of the
            current hop using SNMP:
            Get the appropriate ipRouteNextHop, ipRouteIfIndex,
ipRouteType MIB values from the ipRouteTable MIB table using the
SNMP protocol
```

-continued

```
        If error obtaining SNMP information break
        If the next hop is a broadcast address and ipRoute is indirect
ignore the broadcast address and continue the loop after left shifting the
mask by 1 bit
        If ipRouteNextHop and the interface belonging to
ipRouteIfIndex are not on the same subnet then continue the loop after
left shifting the mask by 1 bit
        If the next hop is such that the ipRouteType is direct but the end
node address is not in one of the subnets of the interfaces of the current
hop then ignore that next hop and continue the
loop after left shifting the mask by 1 bit
        If the interface in the current node corresponding to
ipRouteIfIndex is down then a warning message is emitted. The
determination of that status is made from the ifOperStatus field
which is returned as a part of the ifTable (which was obtained
before the call to getNextHop)
        if no next hop found,
    continue the loop after left shifting the mask by 1 bit
        Return the valid next hop
    }
}
```

In the psuedocode, CalculateActiveLayer3Path calls get NextHop which searches through the routing table of the current node to determine the next hop. The SNMP MIB table for the ipRouteTable table includes the following entries: ipRouteDest, ipRouteIfIndex, ipRouteMask, ipRouteNextHop, and ipRouteTyp. The ipRouteDest corresponds to the subnet number. The ipRouteType indicates a direct or indirect connection. The ipRouteMask indicates a subnet mask for an entry. The ipRouteNextHop indicates the next hop information for an entry.

In an exemplary embodiment, broadcast addresses are ignored when, for example, the ipRouteType type is indirect. If the ipRouteType is direct, then the broadcast address is used. If the ipRouteType is indirect, and the ipRouteDest does not match the logical bitwise ANDing of the end node address and ipRouteMask, the next hop is ignored. If the ipRouteType is direct but the end node is not found on a subnet of one of the interfaces of the current node, the next hop is ignored. These features can be used to, for example, ensure that information in the SNMP MIB table is accurate to avoid bad SNMP agents.

In an exemplary embodiment, the non-routing nodes are determined by the determining step on the same subnet. In the FIG. 3 example, each of the non-routing nodes 318 and 320, between the routing node 304 and routing node 306 are on the same subnet 328. Since the non-routing nodes are on the same subnet, the path through the non-routing nodes can be determined in the same step.

Figure 7:
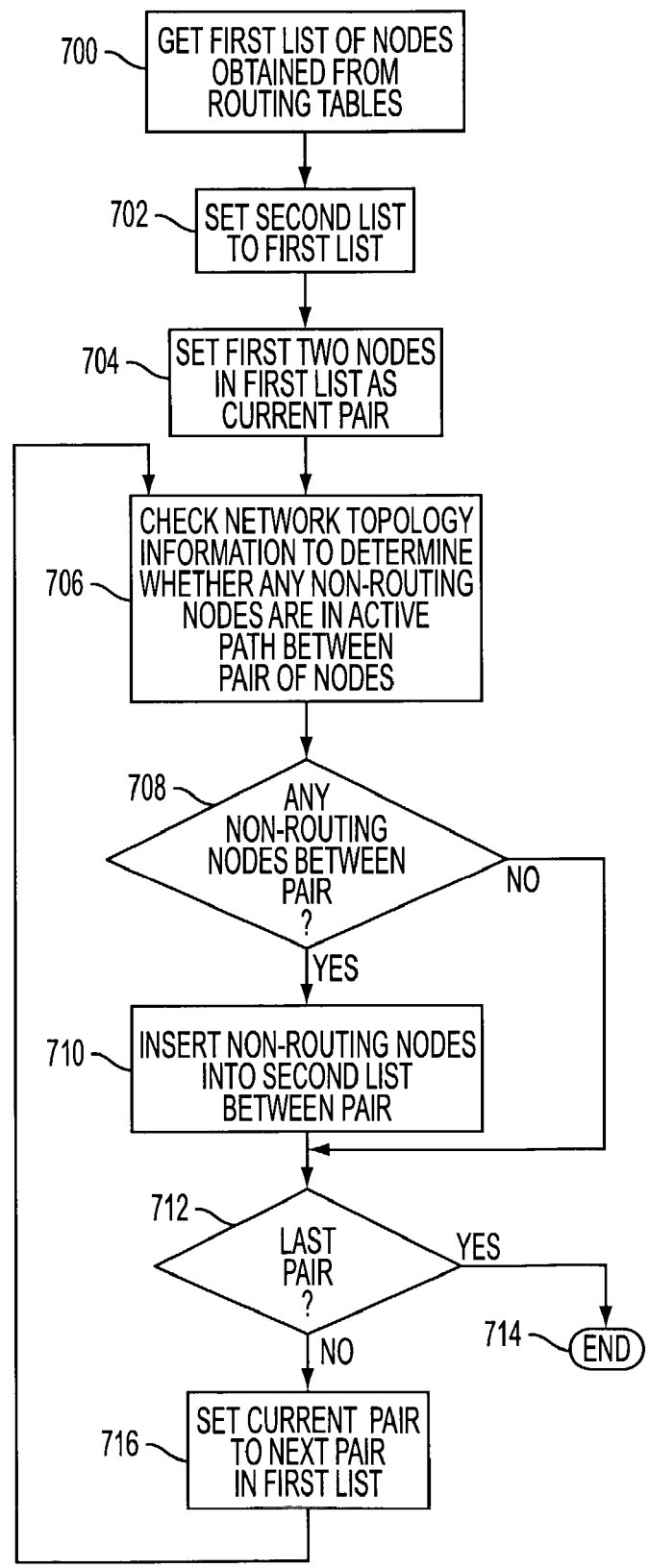
FIG. 7 is a flow chart that illustrates an exemplary method to determine non-routing nodes between pairs of nodes with routing tables.

FIG. 7 illustrates an exemplary method to determine non-routing nodes between a pair of routing nodes (that is, an exemplary technique to implement the FIG. 1 step 104). In step 700 of the exemplary embodiment of FIG. 7, a first list of nodes is obtained from the routing tables (for example, the list of nodes obtained in step 102). This first list of nodes includes a number of pairs of nodes. For the computer network example of FIG. 3, indications of start node 300, routing node 304, routing node 306 and end node 302 are in the first list. In step 702, a second list is set to the first list. In step 704, the first two nodes in first list are set as the "current pair" of nodes. In step 706, the network topology information is checked to determine whether any non-routing nodes are in a path between a pair of nodes, and in decision step 708, a determination is made as to whether there are any non-routing nodes between the pair of nodes. If are any non-routing nodes between the pair, then these non-routing nodes are inserted into the second list between the pair of nodes in step 710.

In step 712, a determination is made as to whether the last pair of nodes in the first list has been examined. If so, then in step 714, the method ends. Otherwise, in step 716, the current pair of nodes is set to the next pair of nodes in the first list. Steps 706, 708, 710, 712 and 716 are iteratively repeated until the last pair of nodes is found.

Figure 8:
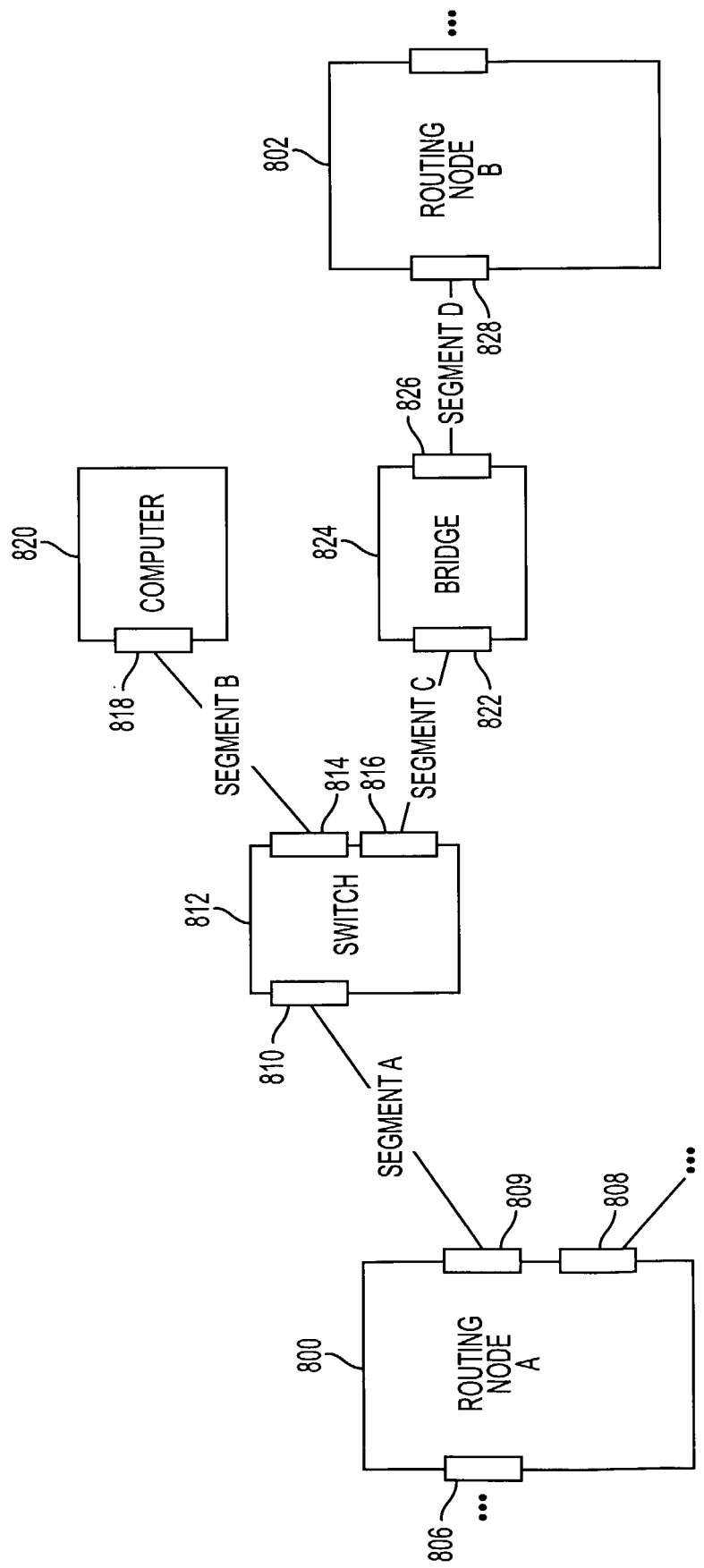
FIG. 8 is a diagram of an exemplary subnet used to determine any non-routing nodes.

FIG. 8 illustrates an example of how network topology information can be checked to determine whether any non-routing nodes are in a path between a pair of nodes. In the FIG. 8 example, the pair of nodes includes routing node 800 and routing node 802 which can, for example, correspond to nodes 304 and 306 of the FIG. 3 example. In this example, the network topology information is arranged such that each node object has associated interface objects, and each segment object (wherein a segment object associates interface objects with one another), has associated interface objects. For example, routing node 800 is associated with interfaces 804, 806 and 808. Segment A is associated with interface 804 of routing node 800 and interface 810 of switch 812.

The system knows, or can determine, ingress and egress ports or pairs of ports for each of the nodes. The representation can include, for example, an indication that interface 804 is an egress interface from which data is sent to the routing node 802. Interfaces 806 and 808 of the routing node 800 can then be ignored.

In an exemplary method, each segment connected to an egress interface of the first node of the pair is checked and every interface associated with that segment is found. The nodes associated with the other interfaces of the segment are also found. Next, the interfaces associated with the additional nodes are found. The method continues to fan out among the segments, interfaces and nodes, until the second node of the pair is found.

In an exemplary embodiment, the method can be used to ensure that the nodes selected are part of the shortest path between the first node of the pair and the second node of the pair. This can be done by continuing the fan-out method until the shortest path can be determined. Those skilled in the art will appreciate that any suitable technique to establish a path between the two nodes can be used, and that a shortest path need not be used.

In the FIG. 8 example, the routing node 800 is associated with segment A, which is associated with interfaces 804 and 810. Interface 810 is associated with node 812. Node 812 is also associated with interfaces 814 and 816. Interface 814 is associated with segment B, which is associated further with interface 818 of node 820. This path to node 820 can be considered a dead end because it does not lead to the second node 802 of the node pair under consideration.

Segment C is associated with interface 816 of non-routing node 812. Segment C is also associated with interface 822 of non-routing node 824. Non-routing node 824 includes interface 826 which, in turn, is associated with segment D. Segment D is associated with interface 828 of the node 802, which is the second node of the pair.

Thus, the method fans out, finds the final node of the pair, and then determines the non-routing nodes in the path between the pair. In the example of FIG. 8, non-routing nodes 812 and 824 are in the path between routing nodes 800 and 802. Each of the node elements between the interface 804 of routing node 800 and interface 828 of routing node 802 are part of a subnet that constitutes a portion of a total path between a start node and an end node.

It will be appreciated by those of ordinary skill in the art that the invention can be implemented in other specific forms without departing from the spirit or character thereof. The presently disclosed embodiments are therefore considered in all respects to be illustrative and not restrictive. The scope of the invention is illustrated by the appended claims rather than the foregoing description, and all changes that come within the meaning and range of equivalents thereof are intended to be embraced herein.

The invention claimed is:

1. A computer implemented method for use during execution of finding a path between two network element nodes by a computer accessing an associated routing table for routing information in a network, comprising:
   obtaining a subnet information from a routing table of a first node in the path to analyze by masking with a sequence of binary 1's shifted with 0's to get a destination address based on the subnet information, and selecting a second node as another node in the path, the obtaining of a subnet information being repeatable with the another node being set as the first node to select the second node, the analyzing by masking including the steps of:
      bitwise ANDing a mask to an address of a next node to get a destination address,
      checking the routing table of the first node for the destination address,
      shifting the mask to add a 0, and
      repeating the bitwise ANDing of the mask to the next node address and checking the routing table of the first node for the destination address until the second node is found or the mask is all 0's;
   determining whether any non-routing nodes are in the path between the first and second nodes; and
   producing an electronic representation of nodes in the path.

2. The method of claim 1, wherein the routing table is an Internet Protocol routing table.

3. The method of claim 1, wherein the routing table is an Internet Protocol forwarding table.

4. The method of claim 1, wherein the routing table is a table maintained for a network management protocol in the first node.

5. The method of claim 1, wherein a first of the two nodes is a start node, and a second of the two nodes is an end node.

6. The method of claim 1, wherein at least one additional node in the path is found using information obtained from a routing table of the second node found in the obtaining step.

7. The method of claim 1, wherein a first of the two nodes is a start node and wherein additional nodes are found in information obtaining steps until the second of the two nodes is found.

8. The method of claim 7, wherein multiple pairs of nodes having routing tables are found in the obtaining step, and the determining step determines whether any non-routing nodes are in the path between a first pair of the multiple pairs, and at least one additional determining step determines whether any non-routing nodes are in a path between another of the multiple pairs.

9. The method of claim 7, comprising:
   determining any non-routing nodes in the path between each of the multiple pairs.

10. The method of claim 1, wherein the routing table includes NextHop information.

11. The method of claim 10 wherein the NextHop information indicates at least one of: a routing node which is the next node; and an interface identifier that allows for finding the next node.

12. The method of claim 1, wherein a network management protocol is used to obtain information from the routing table.

13. The method of claim 12, wherein the network management protocol is the Simple Network Management Protocol.

14. The method of claim 1, wherein the non-routing nodes determined in the determining step are in a subnet.

15. The method of claim 1, wherein the non-routing nodes are determined by examining a stored network topology information.

16. The method of claim 1, wherein the non-routing nodes are determined using a shortest path algorithm.

17. The method of claim 1, wherein the representation includes ingress and egress pairs of ports for each of the first node, the second node and the non-routing nodes.

18. A computer implemented method for use during execution of finding a path between two network element nodes by a computer accessing an associated routing table for routing information in a network, comprising:
   obtaining a subnet information from a routing table of a first node in the path to analyze a destination address based on the subnet information, and select a second node as a next node in the path, wherein the analyzing of the destination address includes bitwise ANDing a subnet mask of a sequence of binary 1's shifted with 0's to an address of an end node in the path, and checking the routing table of the first node for a matching subnet number, the subnet mask being shifted to add a 0 to repeat the bitwise ANDing of the subnet mask to the end node address and checking the routing table for the destination address until the next node is found or the mask is all 0's, the obtaining of a subnet information being repeatable with the next node being set as the first node to select the second node;
   determining whether any non-routing nodes are in the path between the first and second nodes and by examining stored network topology information; and
   producing an electronic representation of nodes in the path.

19. The method of claim 18, wherein the non-routing nodes are determined using a shortest path algorithm.

20. The method of claim 18, wherein the representation includes ingress and egress pairs of ports for each of the first node, the second node and the non-routing nodes.

21. The method of claim 18, wherein the representation is at least one of an electronic display, a table, an electronic file and a printed representation.

* * * * *